United States Patent
Nakayama (10) Patent No.: US 10,424,055 B2
(45) Date of Patent: Sep. 24, 2019

(54) IMAGE PROCESSING APPARATUS AND METHOD FOR CONTROLLING THE SAME

(71) Applicant: CANON KABUSHIKI KAISHA, Tokyo (JP)

(72) Inventor: Tadayoshi Nakayama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 99 days.

(21) Appl. No.: 15/604,962

(22) Filed: May 25, 2017

(65) Prior Publication Data
US 2017/0345137 A1    Nov. 30, 2017

(30) Foreign Application Priority Data

May 27, 2016  (JP) .................. 2016-106713
Mar. 27, 2017 (JP) .................. 2017-061882

(51) Int. Cl.
*G06T 5/00*  (2006.01)

(52) U.S. Cl.
CPC .................. *G06T 5/006* (2013.01)

(58) Field of Classification Search
CPC ..... H04N 2209/046; H04N 2201/0081; H04N 2201/04787; H04N 5/2176
See application file for complete search history.

(56) References Cited

U.S. PATENT DOCUMENTS

| 7,003,174 | B2 * | 2/2006 | Kryukov | H04N 19/86 358/3.26 |
| 7,010,178 | B2 * | 3/2006 | Moroo | G06T 3/0031 382/313 |
| 7,432,966 | B2 * | 10/2008 | Sato | H04N 5/3572 348/222.1 |
| 7,733,391 | B2 * | 6/2010 | Nikkanen | H04N 5/361 348/243 |
| 7,817,586 | B2 * | 10/2010 | Hsieh | G06F 13/385 370/282 |
| 7,817,856 | B2 * | 10/2010 | Yoshii | G06K 9/3266 348/461 |

(Continued)

FOREIGN PATENT DOCUMENTS

JP    2007087258 A    4/2007
JP    2007219950 A    8/2007

*Primary Examiner* — Yosef Kassa
(74) *Attorney, Agent, or Firm* — Rossi, Kimms & McDowell LLP (57) ABSTRACT

The invention realizes, with a circuit size having a small number of multipliers, one-dimensional cubic interpolation, which is a primitive calculation of two-dimensional bicubic interpolation that is often used as high image quality interpolation processing of images. An image processing apparatus includes a first linear interpolation calculator that generates an interpolated pixel value at an interpolation position through linear interpolation, based on pixel values of a pair of pixels among a plurality of pixels, a plurality of second linear interpolation calculators that generate a plurality of correction values by respectively performing linear interpolation based on a pair of difference values among a plurality of difference values between pixel values of the plurality of pixels, and a calculator that generates a pixel value at the interpolation position based on the interpolated pixel value and the plurality of correction values.

10 Claims, 10 Drawing Sheets

(56) References Cited

U.S. PATENT DOCUMENTS

| | | | | |
|---|---|---|---|---|
| 7,940,311 B2* | 5/2011 | Trimeche | ............... | H04N 5/235 |
| | | | | 348/223.1 |
| 8,115,838 B2* | 2/2012 | Tamaoki | ............... | G06T 3/4007 |
| | | | | 348/187 |
| 8,218,037 B2* | 7/2012 | Pinto | ...................... | H04N 5/217 |
| | | | | 348/241 |
| 8,478,066 B2* | 7/2013 | Fujita | ................... | H04N 5/3572 |
| | | | | 345/20 |
| 8,610,801 B2* | 12/2013 | Watarai | .................. | H04N 5/772 |
| | | | | 348/241 |

* cited by examiner

IMAGE PROCESSING APPARATUS AND METHOD FOR CONTROLLING THE SAME

BACKGROUND OF THE INVENTION

Field of the Invention

The present invention relates to technology for performing a calculation for interpolating a pixel value at intermediate coordinates based on pixel values at peripheral discrete coordinates.

Description of the Related Art

An imaging apparatus forms light from an object into an image on an image sensor using an optical lens, and converts the image into electrical signals using the image sensor. However, geometrical distortion (hereinafter referred to as "geometric distortion") tends to occur in peripheral portions of the obtained image due to factors such as acceptable accuracy at the time of lens design or variation accuracy during manufacture. This distortion cannot be ignored due to an increase in the number of imaging pixels to tens of millions of pixels.

On the other hand, when the captured image is processed/edited and viewed, if the image is displayed on a display such as a television, no problem arises, but if the image is projected onto a screen using a projector, geometrical distortion again occurs in some cases due to the following factors.

If the display and the screen face each other exactly, the rectangular shape may be deformed and projected as a trapezoid or trapezium. Also, the optical system of the display is affected by machine accuracy at the time of attachment and accuracy relating to the above-described optical lens, and image distortion caused by these accuracies occurs. In this manner, various types of geometric distortion are superimposed on the image due to various factors at the time of image capture or projection.

Because both cases where images are viewed on a display and viewed with a projector are envisioned, geometric distortion at the time of image capture needs to be corrected at the time of image capture, and geometric distortion at the time of projection with a projector needs to be corrected at the time of projection. Each type of geometric distortion can be reduced by digital image processing.

The data and parameters required to correct geometric distortion can be partially obtained through simulation in the design stage or the like, but are generally obtained in a process called calibration. Calibration can be performed with various methods, and forms one technical field. For example, in correction of trapezoidal distortion at the time of projection with a projector, parameters required for geometric correction are obtained by obtaining the coordinates of the four apexes (four corners) of a distorted quadrangle that results when the original rectangular image is projected without correction, and computing a nomography matrix for correction based on this information.

Technology disclosed in this specification presumes that data and parameters required to correct geometric distortion have already been obtained by calibration or the like. That is, as described above, there are various methods for calibration, and any of these methods can be used.

Figure 1:
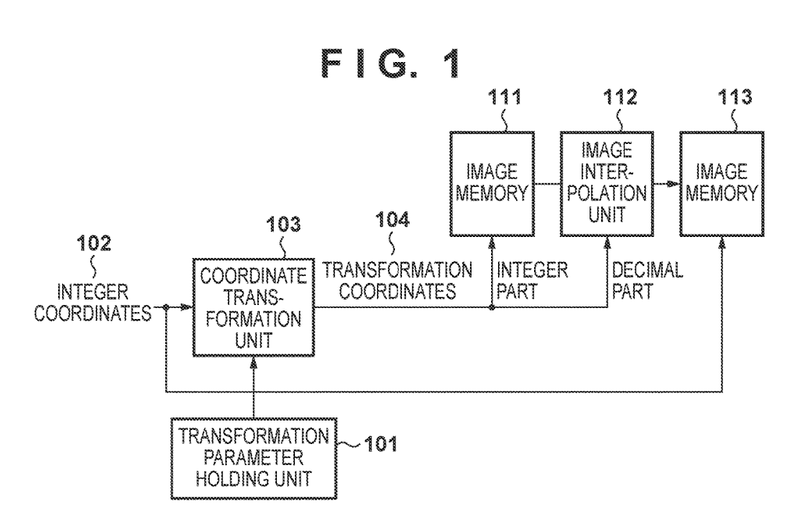
FIG. 1 is a block diagram of general geometric distortion correction processing.

In a block diagram of geometric distortion correction processing shown in FIG. 1, it is assumed that data and parameters required for correction have already been obtained by calibration, and are stored in a transformation parameter holding unit 101.

Regardless of the method for calibration, geometric distortion correction therewith includes two main elements. One is a constituent element relating to coordinate transformation for geometrically deforming an image, and the other is a constituent element relating to coordinate interpolation for computing, through interpolation, pixel values at coordinate positions after the decimal point occurring with this configuration. These operations are respectively performed with a coordinate transformation unit 103 and a pixel interpolation unit 112 in FIG. 1. Then, geometric distortion correction is processed schematically as follows in the block diagram of FIG. 1.

(A1) Integer coordinates 102 obtained when an image is scanned regularly are transformed in the coordinate transformation unit 103 so as to compute transformation coordinates 104.

(A2) Interpolated pixel values corresponding to these transformation coordinates are generated by the pixel interpolation unit 112.

(A3) The generated interpolated pixel values are stored in an image memory 113 as the pixel value of the integer coordinates 102.

In general, the transformation coordinates 104 serve as coordinate data having a decimal part, and thus it is necessary to read out and reference the pixel values of peripheral integer coordinates from the image memory 111 and generate the transformation coordinates 104 through interpolation processing.

Representative interpolation methods include nearest-neighbor interpolation, bilinear interpolation, bicubic interpolation, and the like. From the viewpoint of the order of polynomial interpolation, these interpolation methods are respectively classified as zero-order interpolation, first-order interpolation, and third-order interpolation. The higher the order, the higher the interpolation accuracy and the better the image quality.

An example of another interpolation method classified as the third-order interpolation is a method called cubic spline interpolation, and as the name suggests, this cubic spline interpolation is an interpolation method based on a spline function. The number of pixels referenced at the time of interpolation processing is 1 pixel, 4 pixels, or 16 pixels, which are obtained by adding one to the order and squaring the resultant value, resulting in a calculation amount/circuit size roughly proportional to the referenced number of pixels.

Bilinear interpolation or bicubic interpolation is what is mostly used as actual interpolation processing, and which to selected often depends on whether image quality or circuit size is prioritized. That is, bicubic interpolation is desirably used in terms of the image quality, but bilinear interpolation is often used because of the restriction on circuit size.

In Japanese Patent Laid-Open No. 2007-219950, a reduction in circuit size is achieved by realizing both functions of bilinear interpolation and bicubic interpolation with one interpolation circuit, but the circuit size for bicubic interpolation is not reduced.

Also, Japanese Patent Laid-Open No. 2007-87258 indicates that cubic spline interpolation, which is one example of third-order interpolation, can be realized with a configuration in which linear interpolation calculators are connected in three-cascades. However, this cubic spline interpolation does not have a function of adjusting weighting coefficients of 4×4 pixels for reference, and cannot adjust the image quality in accordance with a system in which an interpolation circuit is used.

Parameters for enabling image quality adjustment are present in bicubic interpolation, and an image that is suitable for the system can be produced. The method of configuring cubic spline interpolation of the prior art, cannot be applied to bicubic interpolation.

Summarizing the above, bicubic interpolation achieves good image quality, but it is problematic in that the circuit size is large. A three-plate type projector requires that different geometric corrections for R, G, and B be performed, and also requires that there is an interpolation circuit for geometric correction for every channel.

Accordingly, in one video system, various types of pixel interpolation processing are required, and if bicubic interpolation is adopted, the calculation processing of the video system as a whole increases.

SUMMARY OF THE INVENTION

According to an aspect of the invention, there is provided an image processing apparatus comprising: a first linear interpolation unit that generates an interpolated pixel value at an interpolation position through linear interpolation, based on pixel values of a pair of pixels among a plurality of pixels; a plurality of second linear interpolation units that generate a plurality of correction values by respectively performing linear interpolation based on a pair of difference values among a plurality of difference values between pixel values of the plurality of pixels; and a generation unit that generates a pixel value at the interpolation position based on the interpolated pixel value and the plurality of correction values.

According to the present invention, it is possible to realize, with a circuit arrangement having a small number of multipliers, an interpolation calculation such as one-dimensional cubic interpolation, which is a primitive calculation of two-dimensional bicubic interpolation that is often used as high image quality interpolation processing of images.

Further features of the present invention will become apparent from the following description of exemplary embodiments with reference to the attached drawings.

DESCRIPTION OF THE EMBODIMENTS

Hereinafter, embodiments according to the present invention will be described with reference to the accompanying drawings. In this embodiment, an example will be described in which pixel values at coordinate positions having values after the decimal point are applied to a pixel interpolation circuit for performing interpolation computation based on pixel values at 2N integer coordinates on the periphery thereof.

Specifically, the pixel interpolation circuit is provided with a first linear interpolation calculator that generates interpolated pixel values at interpolation positions through linear interpolation, based on pixel values of a pair of pixels among a plurality of pixels. Then, provided are a plurality of second linear interpolation calculators that generate a plurality of correction values by respectively performing linear interpolation based on a pair of difference values among a plurality of difference values between pixel values of the plurality of pixels. Moreover, provided is a calculator that generates a pixel value at an interpolation position based on the interpolated pixel values and the plurality of correction values.

First Embodiment

This first embodiment is applied to an interpolation calculation when interpolated pixels are generated with reference to pixel values of n×n peripheral pixels. Specifically, the first embodiment is applied to first cubic interpolation performed n times in n pixel unit on the same straight line in the vertical or horizontal axial direction, and second cubic interpolation performed with reference to these n interpolation results.

In general bicubic interpolation in which 4×4 pixels are referenced, with respect to a coordinate position after the decimal point, 8 coefficients in total consisting of 4 load coefficients for reference pixels in each axial direction are computed based on Equation (1).

$$h(s) = \begin{cases} (a+2)|s|^3 - (a+3)s^2 + 1 & 0 \leq |s| \leq 1 \\ a|s|^3 - 5a|s|^2 + 8a|s| - 4a & 1 \leq |s| \leq 2 \end{cases} \quad (1)$$

Here, a parameter "s" expresses a distance with a sign from the coordinates of an interpolated pixel to a peripheral reference pixel. The direction in which the coordinate increases has a + sign, whereas the direction in which the coordinate decreases has a − sign. Also, a parameter "a" is for adjusting interpolation properties, and is referred to as "first image quality adjustment parameter".

If the computation is performed in this manner, 16 instances of multiplication are required to compute $|s|^2$ or $|s|^3$, and 20 instances of multiplication relating to the parameter "a" are also required, and thus 36 instances of multiplication are required in total to compute eight coefficients. However, in general, the bit number of the parameter "a" is low, and thus the circuit size for this multiplication is small.

When the reference pixel is multiplied by this coefficient, if this multiplication is performed in each axial direction, that is, in two stages, 16 instances of multiplication are required for first-stage coefficient multiplication and 4 instances of multiplication are required for second-stage coefficient multiplication, that is, 20 instances of multiplication are required in total.

In total, 36 (16+20) instances of multiplication with a large circuit size and 20 instances of multiplication with a small circuit size are required.

This embodiment reduces the number of instances of multiplication and the circuit size by computing interpolated pixels equivalent to the cubic interpolation based on Equation (1), with a method different from that of the above description.

In the cubic interpolation calculation of the present embodiment, a decimal part obtained by excluding the integral part from the transformation coordinates (x, y) is given as first-order parameters (tx, ty), and with respect to these parameters, quadratic polynomial parameters are computed based on second-order polynomials tx·(1−tx) and ty·(1−ty).

The number of parameters that are to be computed is only two, and the other main calculation is a parallel calculation for linear interpolation based on the first-order parameter tx or ty.

The computation for these second-order parameters and the parallel calculation for linear interpolation based on first-order parameters are calculations shared by all embodiments described in this specification. Also, in the embodiments described later, the second-order parameters are used as the computed parameters, and description of a method for generating the same will be omitted.

Figure 2:
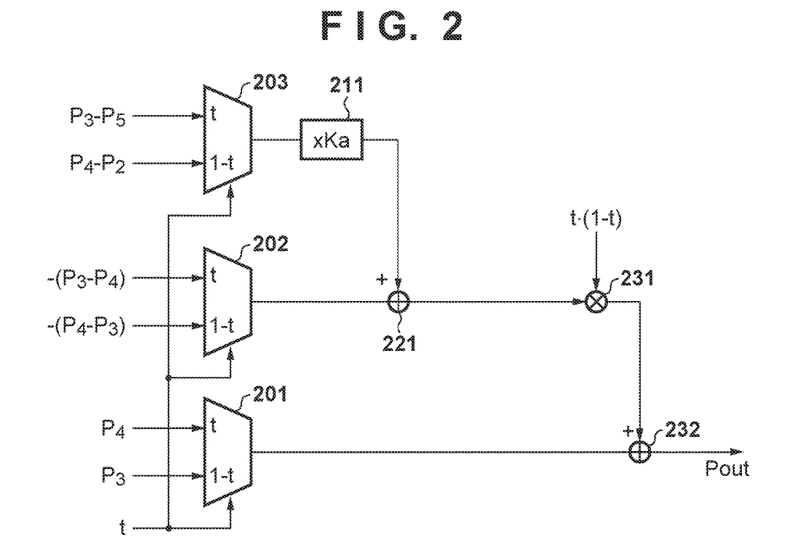
FIG. 2 is a diagram showing a configuration of a cubic interpolation calculator of a first embodiment.

In the first embodiment, which is the first example, three component signals are generated through the parallel calculation for the linear interpolation based on the first-order parameters. FIG. 2 shows the configuration of this first embodiment.

Figure 11:
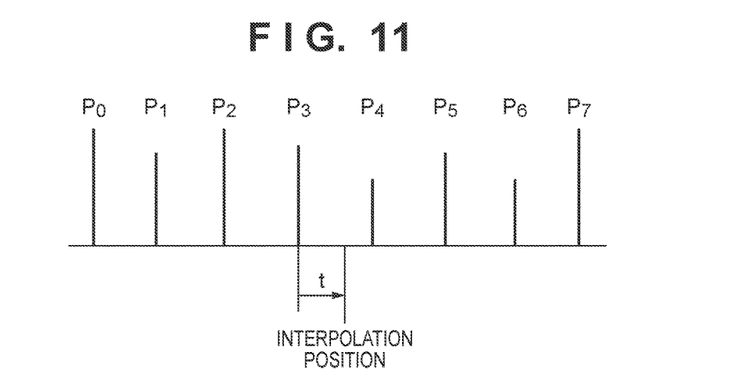
FIG. 11 is a diagram showing a relationship between interpolation positions shared in the embodiments and pixels referenced by an interpolation calculation.

FIG. 11 shows the relationship of a first-order parameter t expressing an interpolation position (interpolation position information) and the arrangement order with the 4 pixels referenced in this first embodiment and the 6 pixels and 8 pixels that will be referenced in other embodiments described later. Herein, a unit distance between pixels is "1". Thus, the first-order parameter t has a relationship 0≤t≤1. In all of the embodiments, the interpolation position is defined between pixels $P_3$ and $P_4$, and pixel value corresponding to this interpolation position is generated by the interpolation calculation. Note that in this specification, $P_0$ to $P_7$ in FIG. 11 express pixels and also pixel values. In general, the pixel value at an interpolation position between an Nth pixel and an (N+1)th pixel in 2N pixels that are continuously arranged is interpolated.

The calculation content of a cubic interpolation calculator shown in FIG. 2 is expressed by equations. When the first-order parameter "t" and the calculation of the linear interpolation calculator having two inputs of $\{P_i, P_j\}$ are expressed by Equation (2), an output $P_{out}$ of the cubic interpolation calculator shown in FIG. 2 is expressed as Equation (3).

$$L(P_i, P_j, t) = tP_i + (1-t)P_j \quad (2)$$

$$P_{out} = L(P_4, P_3, t) + t(1-t)\{L(-(P_3-P_4), -(P_4-P_3), t)\} \quad (3)$$

Here, reference numerals 201, 202, and 203 indicate linear interpolation calculators that perform linear interpolation calculations between two pixels (input signals) that are located 1 pixel apart from each other based on the first-order parameter t, and each generate one component. tx or ty is input to the first-order parameter t.

The linear interpolation calculator 201 computes $(1-t) \cdot P_3 + t \cdot P_4$ for inputs $P_3$ and $P_4$ and outputs the computed value. This expresses linear interpolation connecting $P_3$ and $P_4$. The linear interpolation calculator 201 performs a computation based on a computation equation $P_3 + t \cdot (P_4 - P_3)$ such that the number of instances of multiplication is one in the actual calculation.

Similarly to the linear interpolation calculator 201, the linear interpolation calculators 202 and 203 perform calculation on the input signals shown in FIG. 2 such that the number of instances of multiplication is one. Note that subtractors for generating input signals input to the linear interpolation calculators 202 and 203, such as "$P_3-P_5$", are omitted in FIG. 2.

If the state before interpolation processing is defined as a discrete state in which pixel values are only defined in integer coordinates, the linear interpolation calculator 201 generates components that linearly connect discrete values $P_3$ and $P_4$. That is, it can be interpreted that the linear interpolation calculator 201 generates components that make discrete pixel values continuous. In contrast, the linear interpolation calculators 202 and 203 can be interpreted as follows.

If adjacent pixel values are linearly connected one after another, the waveform thereof becomes an uneven waveform whose first derivative is discontinuous at integer coordinate positions. Components that make the first derivative continuous are generated as second components in the linear interpolation calculator 202.

When the distance between adjacent pixels is given as 1, the slope of a first component waveform viewed from $P_3$ to $P_4$ is "$P_4-P_3$", and a signal that cancels this slope is "$-(P_4-P_3)$". Similarly, the slope of this waveform viewed from $P_4$ to $P_3$ is "$P_3-P_4$", and the signal that cancels this slope is "$-(P_3-P_4)$".

The linear interpolation calculator 202 inputs a slope cancel signal at $P_3$ and a slope cancel signal at $P_4$, and linearly switches these signals based on the first-order parameter t.

If the switched signal is directly added to the output of the linear interpolation calculator 201, the values $P_3$ and $P_4$ in the integer coordinates change, and thus it is necessary to ensure that the second component does not affect the first component at t=0 and 1. This is hereinafter expressed as a "boundary condition" in the embodiments. In order to satisfy this boundary condition, it is necessary to multiply the second component by the second-order parameter, which is a rational method. Reference numeral 231 in FIG. 1 indicates a multiplier that performs this multiplication.

When the linear interpolation signal based on the parameter t multiplied by the second-order parameter relating to t, the obtained signal becomes a signal expressed by a third-order polynomial of t. These characteristics are common to the signals generated by the linear interpolation calculator 203. Thus, this embodiment has a configuration in which the second component and the third component are added in the adder 221 and then the added value is multiplied by the second-order parameter in the multiplier 231, such that the signal generated by the linear interpolation calculator 203 is also multiplied by the second-order parameter.

Incidentally, even if the first derivative is made continuous, the second derivative is still discontinuous, and thus it is expected that the second derivative will be made continuous following the first derivative being made continuous. However, it is difficult to generate components that make the second derivative continuous by only referencing 4 pixels. But it is possible to reduce discontinuity of the second derivative. The linear interpolation calculator 203 is for generating a third component for reducing the discontinuity of the second derivative.

The signals input to the linear interpolation calculator 203 include a differential signal of $P_3$ and $P_5$ that are located one pixel apart horizontally from $P_4$ as the base point, and a differential signal of $P_4$ and $P_2$ that are located one pixel apart horizontally from $P_3$ as the base point.

The sum of the first component and the second component has properties of reliably being in a range of the pixel values $P_3$ and $P_4$ located on both ends of an interpolation section, but if the third component is added, the sum exceeds this range in some cases. That is, the third component can emphasize a gradation difference by adjusting the amplitude of the component to achieve the opposite effect, and adjust the image quality. In order to adjust the amplitude of this third component, the first image quality adjustment parameter Ka is used for multiplication in the multiplier 211. It is sufficient that this parameter value is in a range of 8/16 to 31/16, and a multiplier with a coefficient of about 5 bits is used.

Modification of the equation with Ka=−a makes it possible to confirm that the cubic interpolation calculation of this first embodiment is mathematically equivalent to cubic interpolation based on Equation (1).

Figure 3:
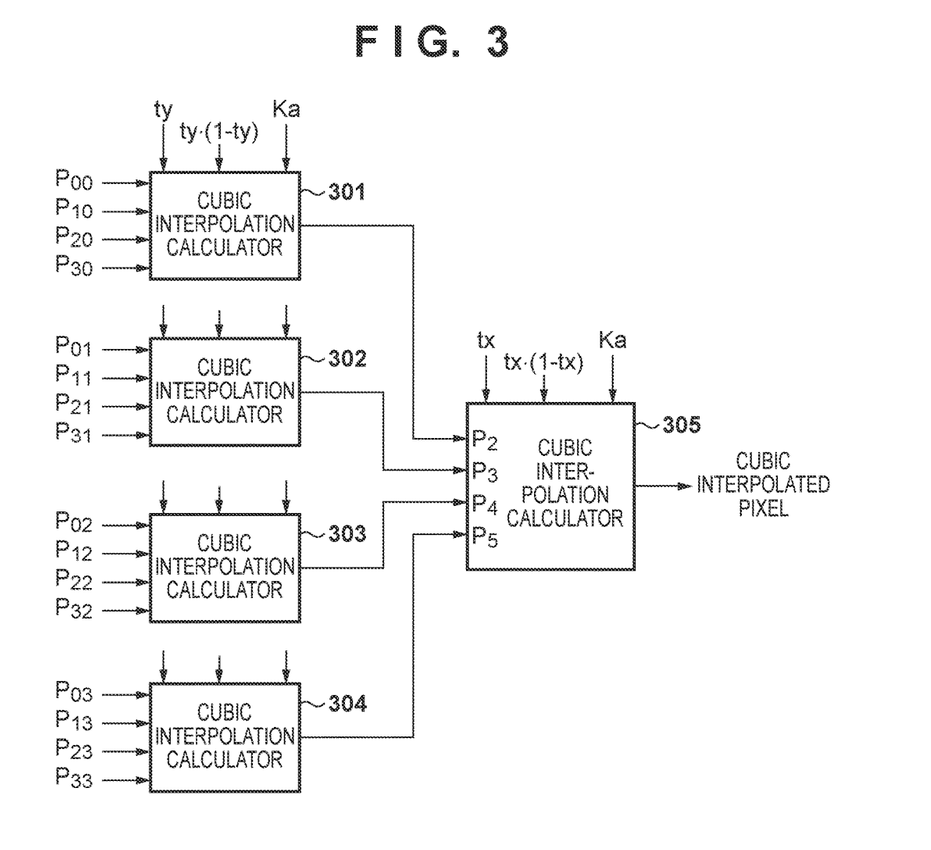
FIG. 3 is a diagram showing a configuration of a bicubic interpolation calculator using the cubic interpolation calculator of the first embodiment.

FIG. 3 shows a configuration for performing processing for bicubically interpolating 4 rows×4 columns=16 pixels ($P_{00}$ to $P_{33}$) using the above-described 5 cubic interpolation calculators that each reference 4 pixels. Here, the coordinates of a pixel $P_{ij}$ are given as ($x_i$, $y_j$), and the coordinates of an interpolated pixel are given as (x, y). With the configuration shown in FIG. 3, each column of pixel data in the 4 columns is processed in parallel with the 4 cubic interpolation calculators 301 to 304. Then, the configuration is such that the obtained 4 interpolation results are subjected to cubic interpolation in the row direction with the cubic interpolation calculator 305, and the results of interpolating the coordinates (x, y) are obtained. The same parameters (ty, ty·(1−ty), Ka) shown in FIG. 3) are supplied to the four cubic interpolation calculators 301 to 304 that perform parallel processing. If pipeline processing is performed with this configuration, it is possible to generate pixels obtained by a bicubic interpolation calculation every 1 cycle. Also, a configuration is possible in which the rows of 16 pixels (4 rows×4 columns) are processed in parallel to each other, and the results of interpolation at 4 coordinate positions, which are horizontal positions the same as those of the interpolated pixels, are obtained, and the obtained results are interpolated in the column direction.

Second Embodiment

There is an interpolation filter obtained by multiplying a sinc function (also referred to as "interpolation function") having a fundamental period by a sinc function having a super period as a window function. This filter is referred to as Lanczos interpolation. The cubic interpolation is referred to as approximation of this Lanczos interpolation.

If enlargement interpolation processing is performed with the Lanczos filter, when the reference pixel number in one axial direction is given as 2n, a Lanczos-n filter is used. A Lanczos-3 filter that references 6 pixels is generally used. In contrast, basically, cubic interpolation references 4 pixels.

An equation corresponding to the computation of the load coefficients of Equation (1) above for extending the reference pixel number for cubic interpolation to 6 pixels has been published, and thus in principal, it is possible to extend the pixel number to 6 pixels. However, material showing a specific circuit arrangement has not been found yet. It is conceivable that compared to referencing 4 pixels, the computation for 6 load coefficients is more complicated, and thus is not practical.

Figure 4:
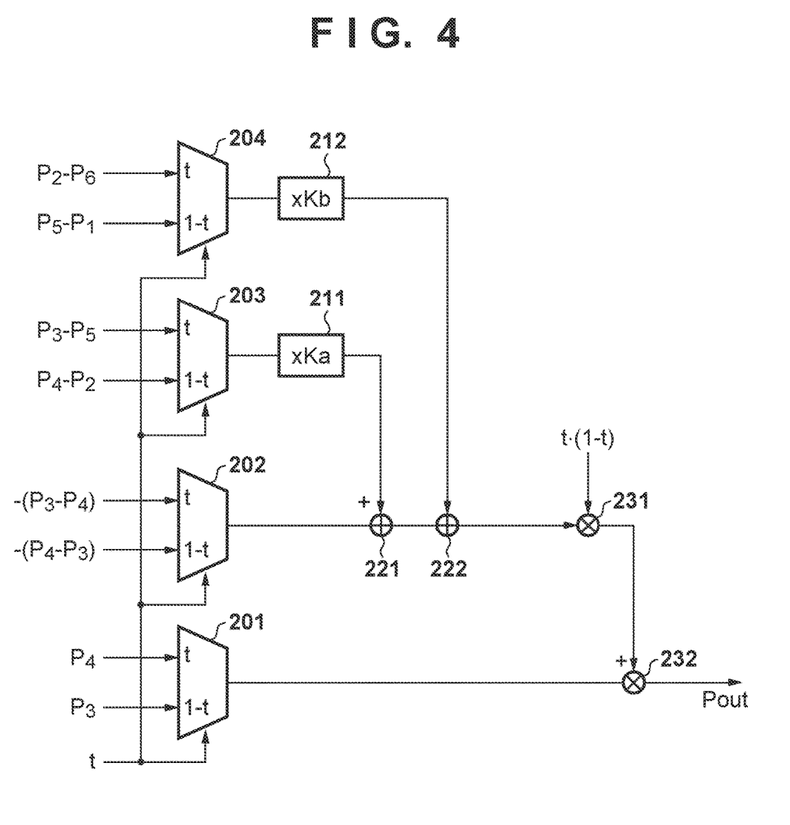
FIG. 4 is a diagram showing a configuration of a six-pixel referenced cubic interpolation calculator in a second embodiment.
Figure 5:
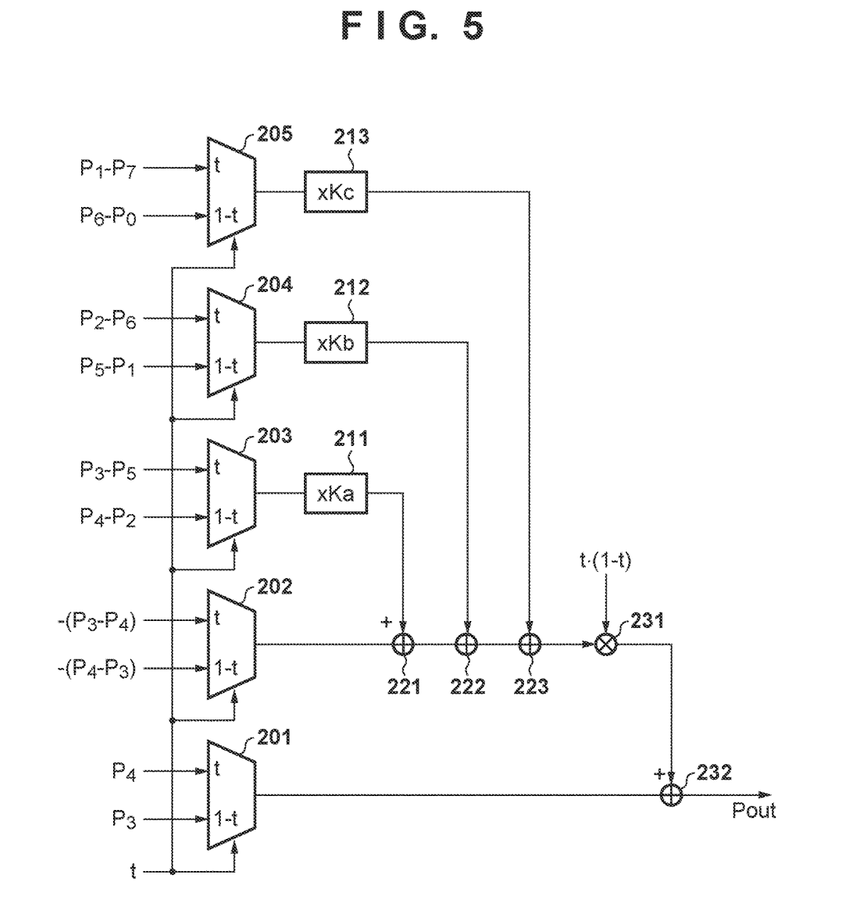
FIG. 5 is a diagram showing a configuration of an eight-pixel referenced cubic interpolation calculator in the second embodiment.

However, the present embodiment can easily extend the reference pixel number for cubic interpolation in one direction to 6 pixels or 8 pixels. FIG. 4 shows the circuit arrangement of cubic interpolation that references 6 pixels and FIG. 5 shows the circuit arrangement of cubic interpolation that references 8 pixels.

The validity of extension according to the present embodiment can be judged by how close the cubic interpolation of the present embodiment is able to realize properties to Lanczos interpolation based on the fact that cubic interpolation is an approximation of Lanczos interpolation.

First, the concept of extension will be described, and then how close the cubic interpolation is to the properties of Lanczos interpolation will be shown. Three basic concepts for extension will be shown in (1) to (3).

(1) A new signal component is multiplied by the second-order parameter so as to satisfy the boundary condition.

(2) The new signal component is subjected to the linear interpolation calculation in a first stage so as to become a third-order polynomial.

(3) The form of a signal input to the third linear interpolation calculator is followed, and differential signals between 2 pixels that are located an equivalent distance apart horizontally from $P_3$ and $P_4$ as the base points are input to the linear interpolation calculation.

In the cubic interpolation calculators, which are shown in FIG. 4, that reference 6 pixels, a fourth linear interpolation calculator 204 that operates in parallel thereto is provided, and differential signals between 2 pixels that are input to this calculator are computed as follows.

One is a difference "$P_2-P_6$" between two pixels that are located 2 pixels apart horizontally from the $P_4$ pixel as the base point, and the other is a difference "$P_5-P_1$" between two pixels that are located 2 pixels apart horizontally from the $P_3$ pixel as the base point. These difference signals are input to the fourth linear interpolation calculator 204 and the linear interpolation calculation is performed, output thereof is multiplied by a second image quality adjustment parameter Kb, the multiplied output is added to the other signal in the adder 222, and then the resulting value is multiplied by the second-order parameter.

Also, in the cubic interpolation calculators, which are shown in FIG. 5, that reference 8 pixels, a fifth linear interpolation calculator 205 that operates in parallel is added to the cubic interpolation calculators that reference 6 pixels shown in FIG. 4, and differential signals between 2 pixels that are input to this linear interpolation calculator 205 are computed as follows.

One is a difference "$P_1-P_7$" between two pixels that are located 3 pixels apart horizontally from the $P_4$ pixel as the base point, and the other is a difference "$P_6-P_0$" between two pixels that are located 3 pixels apart horizontally from the $P_3$ pixel as the base point. These are input to the fifth linear interpolation calculator 205 and the linear interpolation calculation is performed, output thereof is multiplied by a third image quality adjustment parameter Kc, the multiplied output is added to the other signal in the adder 223, and then the resulting value is multiplied by the second-order parameter. Similarly, it is also possible to further easily extend reference pixels using differences between pixel values of pixels that are located the same pixel number, namely, 2, 4, ... , 2·(N−1) pixels, apart horizontally from the base points.

Outputs $P_{out}$ of the above-described cubic interpolation calculators shown in FIGS. 4 and 5, when expressed by equations, will be as shown in Equation (4) and Equation (5).

$$P_{out}=L(P_4,P_3,t)+t(1-t)\{L(-(P_3-P_4),-(P_4-P_3),t)+Ka\cdot L(P_3-P_5,P_4-P_2,t)+Kb\cdot L(P_2-P_6,P_5-P_1,t)\} \quad (4)$$

$$P_{out}=L(P_4,P_3,t)+t(1-t)\{L(-(P_3-P_4),-(P_4-P_3),t)+Ka\cdot L(P_3-P_5,P_4-P_2,t)+Kb\cdot L(P_2-P_6,P_5-P_1,t)+Kc\cdot L(P_1-P_7,P_6-P_0,t)\} \quad (5)$$

Figure 6:
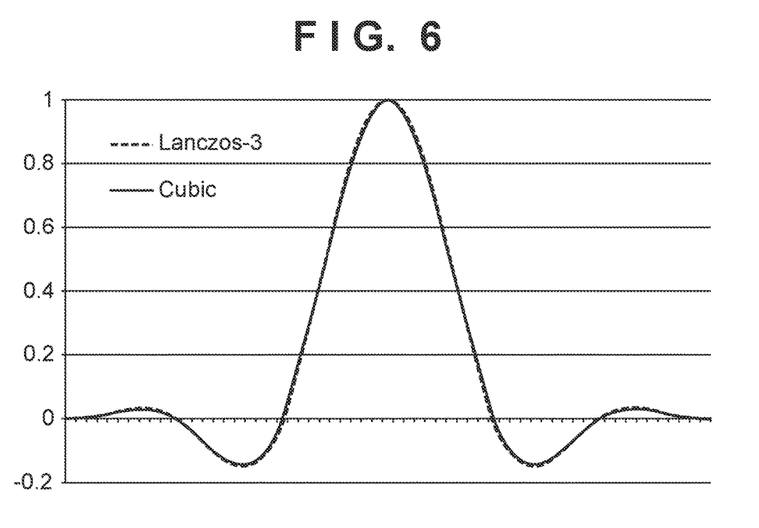
FIG. 6 is a diagram, comparing impulse responses of the six-pixel referenced cubic interpolation calculator and Lanczos-3.

In the cubic interpolation, which is shown in FIG. 4, that references 6 pixels, comparison of impulse responses when two image quality adjustment parameters are set to Ka=14/16 and Kb=−3/16 with Lanczos-3 is shown as the waveforms in FIG. 6.

Figure 7:
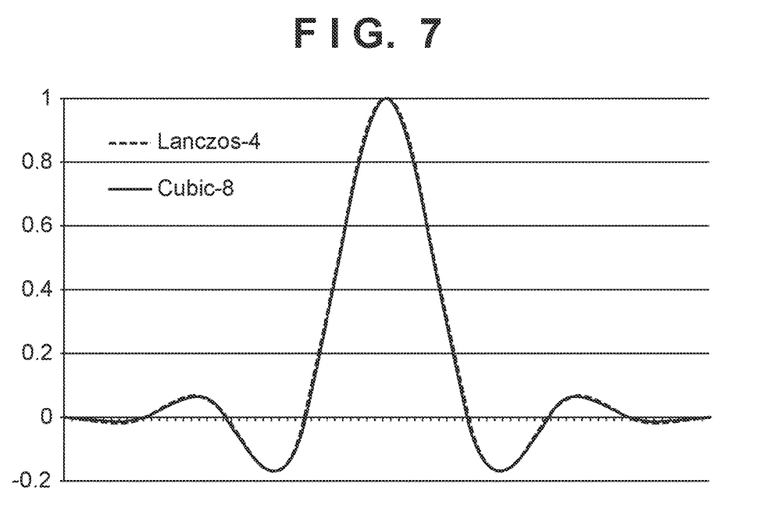
FIG. 7 is a diagram, comparing impulse responses of the eight-pixel referenced cubic interpolation calculator and Lanczos-4.

Also, in the cubic interpolation, which is shown in FIG. 5, that references 8 pixels, comparison of impulse responses when three image quality adjustment parameters are set to Ka=31/32 and Kb=−12/32, Kc=3/32 with Lanczos-4 is shown as the waveforms in FIG. 7.

If the image quality adjustment parameter group is set appropriately, it is evident that interpolation filter properties that are close to Lanczos-3 and Lanczos-4 can be realized. Furthermore, in actual use, the parameters are optimized for the system by being adjusted while checking the image quality based on the parameter values.

This configuration is greatly advantageous in that, even though the filter coefficient of the Lanczos interpolation filter is uniquely determined in accordance with the reference pixel number and the image quality cannot be adjusted, the cubic interpolation of this second embodiment enables image quality to be easily adjusted.

Third Embodiment

The above-described first embodiment directly configures the basic concept of a pixel interpolation calculation into a circuit, and thus has a very simple configuration.

A third embodiment is for realizing a calculation equivalent to that of the first embodiment with a smaller number of multipliers by slightly modifying the computation equations of the first embodiment.

Figure 8:
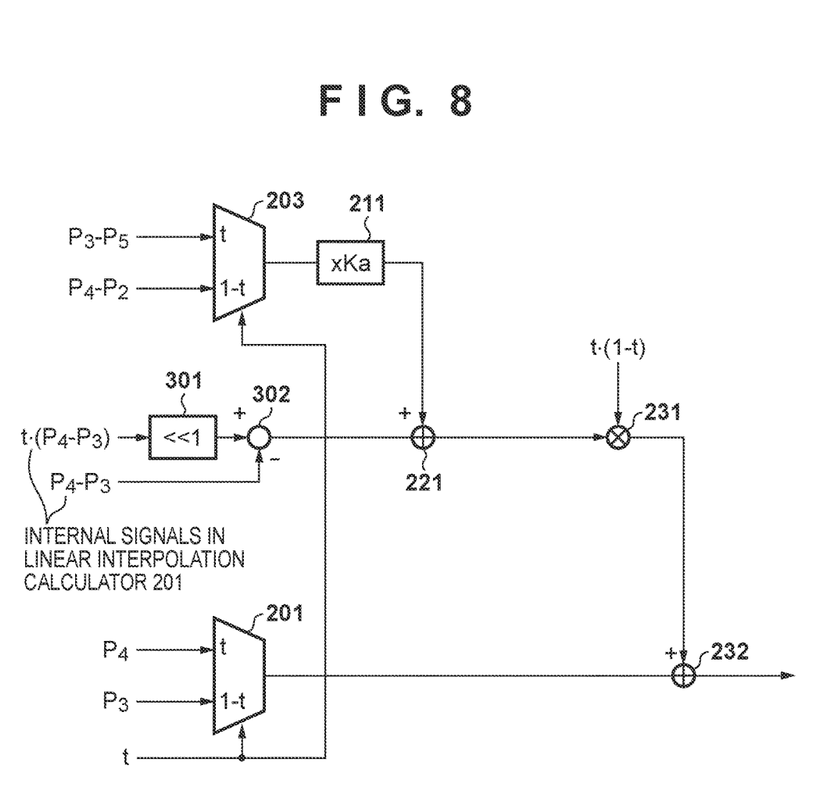
FIG. 8 is a diagram showing a configuration of a cubic interpolation calculator of a third embodiment.

Specifically, the second component is generated by using the results of an internal calculation of the first linear interpolation calculator 201, without using the second linear interpolation calculator 202. A specific configuration is shown in FIG. 8.

The second linear interpolation calculator 202 in FIG. 2 is for linear interpolating "−(P$_4$−P$_3$)" and "−(P$_3$−P$_4$)" based on the parameter t, and the calculation result is expressed as "(2t−1)·(P$_4$−P$_3$)".

It was stated in the first embodiment that the actual calculation of the first linear interpolation calculator 201 is performed with the computation equation "t·(P$_4$−P$_3$)+P$_3$" such that the number of instances of multiplication is one.

In this calculation process, it is clear that the first linear interpolation calculator 201 computes "(P$_4$−P$_3$)" and "t·(P$_4$−P$_3$)", and the signals of this internal calculation can be used.

If a shifting calculator 301 performs 2-fold shifting of the latter "t·(P$_4$−P$_3$)", that is, performs 1 bit shifting to the left, and the subtractor 302 subtracts "(P$_4$−P$_3$)", "(2t−1)·(P$_4$−P$_3$)" can be obtained. Thus, a second linear interpolation calculator having a multiplier need not be used.

The configuration shown in this third embodiment can be applied to the second embodiment or a fourth embodiment, which will be described next.

Fourth Embodiment

In the first and second embodiments, the inputs to the third linear interpolation calculator 203 is each a difference value between pixels that are located 2 pixels apart from each other, and the inputs to the fourth linear interpolation calculator 204 is each a difference value between pixels that are located 4 pixels apart from each other. It can be said that both difference values are each a difference between pixels, that is, both difference values are each obtained by only changing the distance between 2 pixels that take a first derivative.

Such a configuration is suitable for minimizing a difference caused by the configuration when the cubic interpolation calculators that reference n pixels are extended to the cubic interpolation calculators that reference (n+2) pixels. However, the inputs to each linear interpolation calculator are not merely limited to the forms of the first and second embodiments.

For example, it is also possible that the inputs to the second linear interpolation calculator are interpreted as first derivative signals of reference pixel values, and second derivative signals of the reference pixel values are input to the third linear interpolation calculator, and third derivative signals of the reference pixel value are input to the fourth linear interpolation calculator. This results in signal components generated by the linear interpolation calculators having different meanings.

Figure 9:
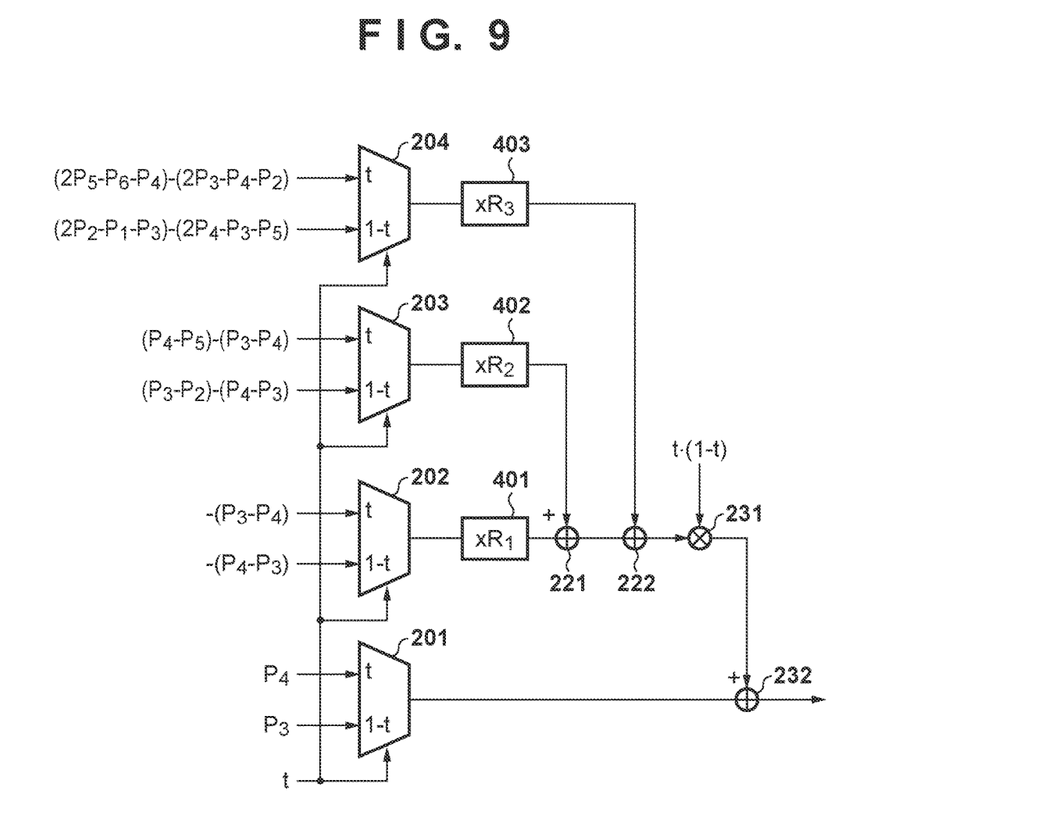
FIG. 9 is a diagram showing a configuration of a cubic interpolation calculator of a fourth embodiment.

Specifically, as shown in FIG. 9, as the second derivative signals, (P$_4$−P$_5$)−(P$_3$−P$_4$)=2·P$_4$−P$_3$−P$_5$ and (P$_3$−P$_2$)−(P$_4$−P$_3$)=2·P$_3$−P$_4$−P$_2$ are input to the third linear interpolation calculator 203.

Then, as the third derivative signals, (2·P$_5$−P$_6$−P$_4$)−(2·P$_3$−P$_4$−P$_2$)=P$_2$−2·(P$_3$−P$_5$)−P$_6$, and (2·P$_2$−P$_1$−P$_3$)−(2·P$_4$−P$_3$−P$_5$)=P$_5$−2·(P$_4$−P$_2$)−P$_1$ are input to the fourth linear interpolation calculator 204.

In this case, parameters R$_1$, R$_2$, and R$_3$ that are different from those in the first and second embodiments are used for multiplication as the parameters for adjusting the amplitudes of the components. As specific values, when R$_1$ is set to 0, R$_2$ is set to 8/16, and R$_3$ is set to −3/16, the impulse response characteristics shown in FIG. 6, that is, characteristics that are close to Lanczos-3, are achieved.

Fifth Embodiment

Although the configuration in FIG. 4 has three linear interpolation calculators before the second-order parameters are used for multiplication, these calculators can be collected into one calculator.

Because the linear interpolation calculation, multiplication and addition processing of the image quality adjustment parameters based on the parameter t are all linear calculations, the order of calculations can be changed. In view of this, the linear interpolation calculation is moved after the addition processing, and the order of processing is changed to multiplication processing of the image quality adjustment parameters, addition processing thereof, and the linear interpolation calculation.

Figure 10:
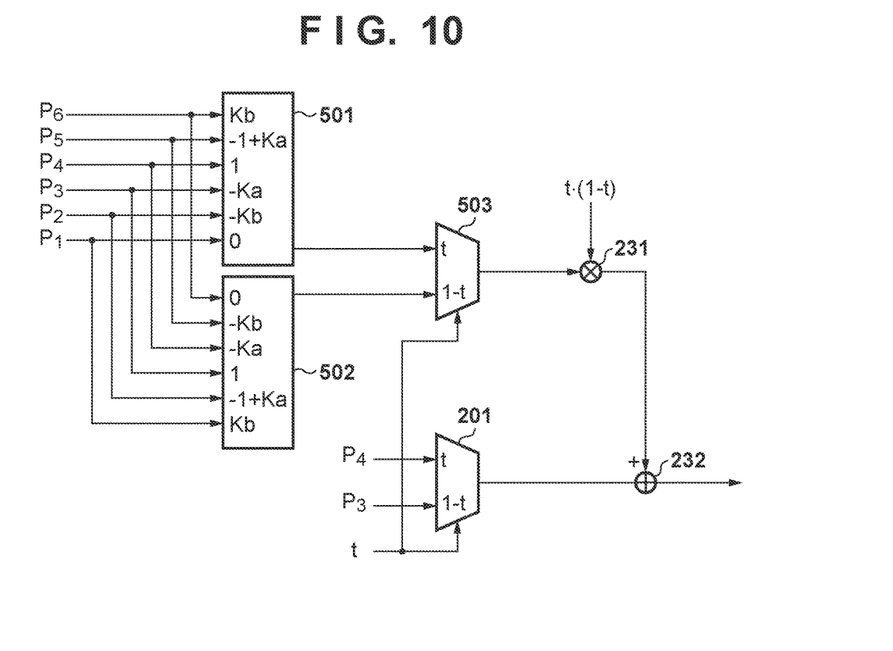
FIG. 10 is a diagram showing a configuration of a cubic interpolation calculator of a fifth embodiment.

Accordingly, a plurality of linear interpolation calculations can be collected into one calculation, and the configuration shown in FIG. 10 is possible. In FIG. 10, calculators 501 and 502 are weighting adders that each weight input signals and add the weighted signals, and a calculator 503 is a linear interpolation calculator that collects two calculations into one calculation. The remaining configuration is the same as that in FIG. 4 of the second embodiment.

Weighting for the input signals reflects the image quality adjustment parameters Ka and Kb in FIG. 4 of the second embodiment, and the configuration of FIG. 10 is functionally equivalent to the configuration of FIG. 4.

Also, the method of this fifth embodiment can be applied to cubic interpolation, which is shown in FIG. 5, that references 8 pixels. That is, it is sufficient that the weighting adders 501 and 502 are extended to 8 pixel inputs, and weighting that reflects an image quality adjustment parameter Kc is performed.

Sixth Embodiment

The linear interpolation calculation for the differential signals between pixels in the above-described three cubic interpolation equations, namely, Equations (3) to (5) can be substituted with a difference calculation for linear interpolation signals between pixels by changing the order of the difference calculation and linear interpolation calculation. At this time, the linear interpolation is performed on pixels in which 2 pixels form a pair in which the sum of the subscripts of the two pixels is 7. This is because the linear interpolation calculation is performed between 2 pixels that are in a positional relationship that is symmetric to the center of the interpolation section (between the pixels $P_3$ and $P_4$ in this embodiment).

When changing of the order of calculations described above is applied to Equations (3), (4), and (5), these can be modified as the following Equations (6), (7), and (8).

$$P_{out}=L(P_4,P_3,t)+t(1-t)[L(P_4,P_3,t)-L(P_3,P_4,t)-Ka\{L(P_5,P_2,t)-L(P_3,P_4,t)\}] \quad (6)$$

$$P_{out}=L(P_4,P_3,t)+t(1-t)[L(P_4,P_3,t)-L(P_3,P_4,t)-Ka\{L(P_5,P_2,t)-L(P_3,P_4,t)\}-Kb\{L(P_6,P_1,t)-L(P_2,P_5,t)\}] \quad (7)$$

$$P_{out}=L(P_4,P_3,t)+t(1-t)[L(P_4,P_3,t)-L(P_3,P_4,t)-Ka\{L(P_5,P_2,t)-L(P_3,P_4,t)\}-Kb\{L(P_6,P_1,t)-L(P_2,P_5,t)\}-Kc\{L(P_7,P_0,t)-L(P_1,P_6,t)\}] \quad (8)$$

Figure 12:
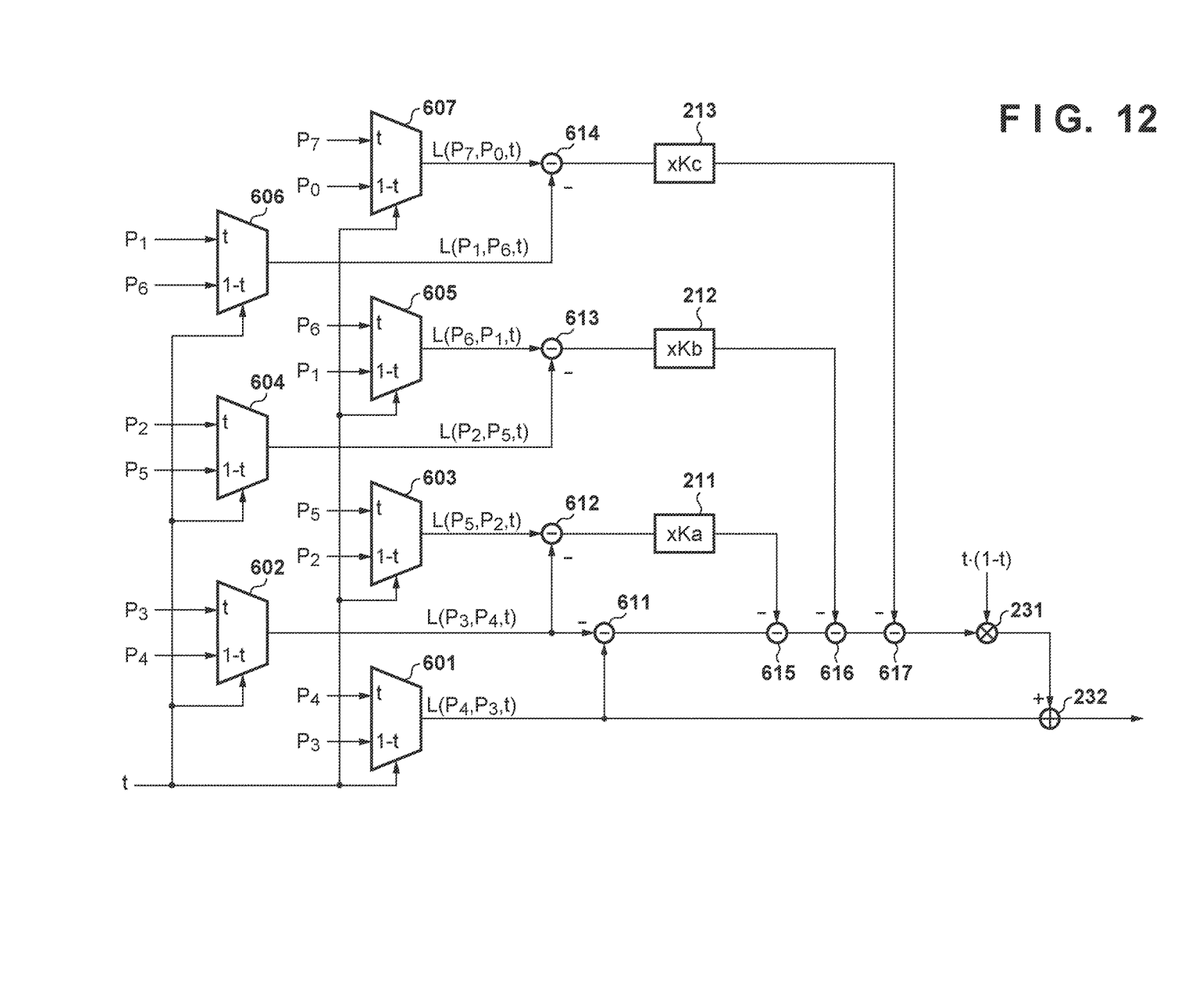
FIG. 12 is a diagram showing a configuration of a cubic interpolation calculator of a sixth embodiment.

Equations (6) and (7) each have a form obtained by cutting out a portion of Equation (8). In view of this, the configuration of the calculation circuit in Equation (8) is shown in FIG. 12 as a representative example. In FIG. 12, reference numerals 601 to 607 are linear interpolation calculators, reference numerals 611 to 617 are subtractors, and the other constituent elements are the same as the constituent elements with the same reference numerals in FIG. 5 in the second embodiment.

It is evident from the configuration of FIG. 12 that when Equation (8) is simply made into a calculation circuit, the number of linear interpolation calculators increases from 4 to 7, which is nearly 2-fold. This configuration will increase the number of multipliers used in the linear interpolation calculators, and thus the circuit size also increases.

Incidentally, the result of addition of linear interpolation with inputs of the pixels $P_4$ and $P_3$ and linear interpolation with inputs of $P_3$ and $P_4$ obtained by mutually replacing these inputs does not depend on the interpolation position and is constant at $P_3+P_4$. A circuit arrangement for a cubic interpolation calculation obtained by reducing the number of multipliers using this relationship will be described below.

Here, two linear interpolation values obtained before and after the 2 inputs to the linear interpolation calculators are mutually interchanged are expressed as a linear interpolation pair, and a calculation unit that calculates this linear interpolation pair is expressed as a linear interpolation pair calculation unit.

In FIG. 12, three pairs of linear interpolation calculators 601 and 602, 603 and 604, and 605 and 606 serve as the linear interpolation pair calculation units.

When calculations are performed as shown next in Equation (9), the linear interpolation pair calculation units can reduce the number of instances of multiplication from 2 to 1. Also, it is evident that when the right sides of the two equations are added, $P_i+P_j$ is achieved.

$$L(P_j,P_i,t)=P_i+t(P_j-P_i) \quad L(P_i,P_j,t)=P_j-t(P_j-P_i) \quad (j>i) \quad (9)$$

When computations are performed as described above, the calculations for members multiplied by t can be shared, and these linear interpolation pairs can be calculated by only performing one addition and one subtraction thereafter. Then, the linear interpolation pairs can be generated through the calculations with the circuit size obtained by adding one subtractor to a usual linear interpolation calculator, and thus this embodiment is very efficient.

Figure 13:
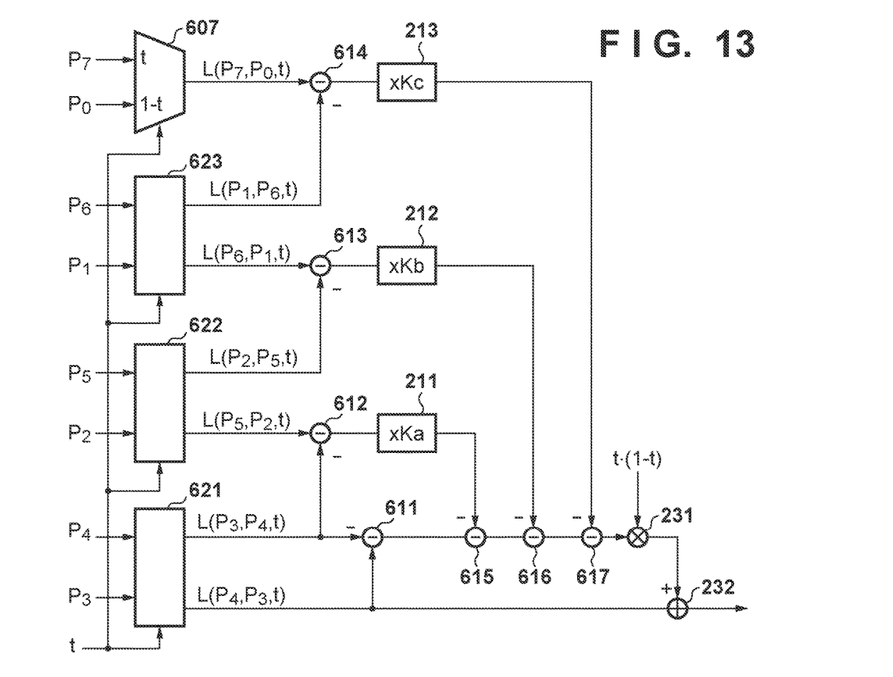
FIG. 13 is a diagram showing a variation of the cubic interpolation calculator of the sixth embodiment.

The configuration shown in FIG. 13 is such that these calculation units are expressed as one calculator, which is referred to as the linear interpolation pair calculator. In FIG. 13, three reference numerals 621, 622, and 623 express the linear interpolation pair calculators that perform calculations in Equation (9).

Equation (9) above may be computed as Equation (10) shown below.

$$L(P_j,P_i,t)=t(P_j-P_i)+P_i \quad L(P_i,P_j,t)=t(P_j-P_i)-P_j \quad (j>i) \quad (10)$$

In this case, the relationship of the signs in the second equation is inversed to that in Equation (9). If the linear interpolation pair calculator that performs the calculations of Equation (10) is used, substitution of the subtractors 611 to 614 with the adders makes this configuration equivalent to the configuration in FIG. 13.

Furthermore, if the signs of parameters used for multiplication in the image quality adjustment parameter multipliers 211 to 213 are inverted, it is also necessary to substitute the subtractors 615 to 617 with adders.

In this manner, the subtractors 611 to 617 can be substituted with adders depending on the calculations in the preceding stage or the signs of parameters, and it is necessary to define the type of calculators such that the calculation circuit overall functions as a cubic interpolation calculation.

Figure 14:
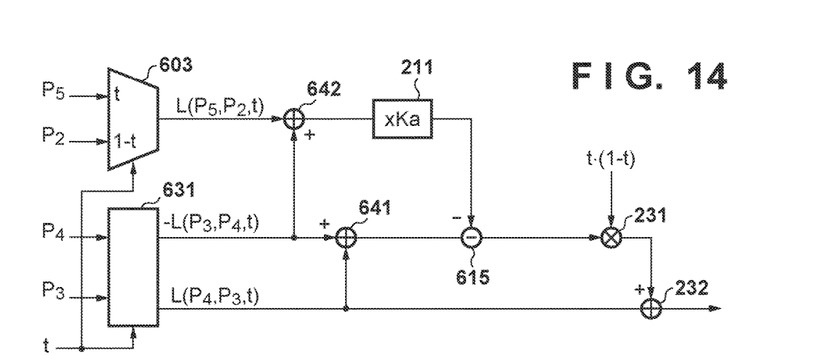
FIG. 14 is a diagram showing a second variation of the cubic interpolation calculator of the sixth embodiment.

The configuration of the cubic interpolation calculation circuit that references 4 pixels, which performs an interpolation calculation of Equation (6) using a linear interpolation pair calculator 631 performing the calculations of Equation (10), is shown in FIG. 14 as one example. In FIG. 14, the subtractors 611 and 612 in FIG. 13 are substituted with adders 641 and 642.

In the configurations of the first and second embodiments, in order to further reduce the number of multipliers required in the linear interpolation calculation, the technique in the third embodiment needs to be used in combination. On the other hand, in the configuration in FIG. 13 of this sixth embodiment based on Equations (8) and (9), the number of multipliers are the same as that when the third embodiment is used in combination with the second embodiment.

Although cubic interpolation and a method for realizing, with hardware, bicubic interpolation in which the cubic interpolation is applied to a two-dimensional pixel were described in detail above, all calculations can be substituted with software processing. In this case, if a processor that controls apparatuses such as an information processing apparatus executes that software, the processor executes calculators and the like in the block diagrams shown in the embodiments as functions or procedures. Therefore, the present invention can be utilized as a cubic interpolation calculation method with a software calculation.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-106713, filed May 27, 2016, and No. 2017-061882, filed Mar. 27, 2017, which are hereby incorporated by reference herein in their entirety.

What is claimed is:

1. An image processing apparatus comprising:
a first linear interpolation circuit that generates an interpolated pixel value at an interpolation position through linear interpolation, based on pixel values of a pair of pixels among a plurality of pixels;
a plurality of second linear interpolation circuits that generate a plurality of correction values by respectively performing linear interpolation based on a pair of difference values among a plurality of difference values between pixel values of the plurality of pixels;
a first multiplication circuit that multiplies the plurality of correction values by a parameter relating to a boundary condition at the interpolation position; and
a generation circuit that generates a pixel value at the interpolation position based on the interpolated pixel value and the plurality of correction values multiplied by the parameter.

2. The apparatus according to claim 1, wherein:
the plurality of pixels are arranged on the same straight line as the interpolation position, and when a distance between the pixels is given as 1 and a distance from one of the plurality of pixels to the interpolation position is given as t, the parameter is expressed as $t \cdot (1-t)$.

3. The apparatus according to claim 1, wherein:
the plurality of pixels are 2N pixels, and
the plurality of second linear interpolation circuits generate the plurality of correction values using linear interpolation on a difference value between pixel values of pixels that are located 1 pixel apart from each other and linear interpolation on difference values between pixel values of pixels that are located $2, 4, \ldots, 2 \cdot (N-1)$ pixels apart from each other.

4. The apparatus according to claim 1, further comprising:
a second multiplication circuit that multiplies at least one of the plurality of correction values by a parameter for adjusting image quality.

5. An image processing system that generates a pixel value at a target position, based on a plurality of pixels that are arranged in a plurality of rows and a plurality of columns, the image processing system comprising:
a plurality of first image processing apparatuses that each generate, for each of the plurality of columns, a pixel value at the same vertical position as the target position, based on pixel values of the plurality of pixels in the column; and
a second image processing apparatus that generates a pixel value at the target position, based on the plurality of pixel values generated by the plurality of first image processing apparatuses,
wherein the first image processing apparatuses and the second image processing apparatus each have a configuration of the image processing apparatus according to claim 1.

6. An image processing system that generates a pixel value at a target position, based on a plurality of pixels that are arranged in a plurality of rows and a plurality of columns, the image processing system comprising:
a plurality of first image processing apparatuses that each generate, for each of the plurality of rows, a pixel value at the same horizontal position as the target position, based on pixel values of the plurality of pixels in the row; and
a second image processing apparatus that generates a pixel value at the target position, based on the plurality of pixel values generated by the plurality of first image processing apparatuses,
wherein the first image processing apparatuses and the second image processing apparatus each have a configuration of the image processing apparatus according to claim 1.

7. An image processing apparatus that generates a pixel value at an interpolation position designated in an interpolation section between an Nth pixel and an (N+1)th pixel, based on pixel values of 2N pixels that are continuous, the image processing apparatus comprising:

a first linear interpolation calculation circuit that generates a linear interpolation value for 2 pixels that are in a symmetrical positional relationship in relation to the interpolation section;

a second linear interpolation calculation circuit that generates, for each of (N−1) groups of 2 pixels that are in a symmetrical positional relationship excluding pixels at both ends of the 2N pixels, two types of linear interpolation values consisting of a linear interpolation value of pixel values of the group and a linear interpolation value of pixel values in a group in which the 2 pixels of the group are interchanged;

an addition and subtraction calculation circuit that generates a value obtained by an addition or subtraction calculation between outputs of the first and second linear interpolation calculation circuits; and a multiplication circuit that multiplies the value generated by the addition and subtraction calculation circuit by a parameter relating to a boundary condition in the interpolation section.

8. A method of controlling an image processing apparatus, the method comprising the steps of:

generating an interpolated pixel value at an interpolation position through linear interpolation, based on pixel values of a pair of pixels among a plurality of pixels;

generating a plurality of correction values by respectively performing linear interpolation based on a pair of difference values among a plurality of difference values between pixel values of the plurality of pixels;

multiplying the plurality of correction values by a parameter relating to a boundary condition at the interpolation position; and generating a pixel value at the interpolation position based on the interpolated pixel value and the plurality of correction values multiplied by the parameter.

9. A method of controlling an image processing apparatus that generates a pixel value at an interpolation position designated in an interpolation section between an Nth pixel and an (N+1)th pixel, based on pixel values of 2N pixels that are continuous, the method comprising the steps of:

generating a linear interpolation value for 2 pixels that are in a symmetrical positional relationship in relation to the interpolation section;

generating two types of linear interpolation values for, for each of (N−1) groups of 2 pixels that are in a symmetrical positional relationship excluding pixels at both ends of the 2N pixels, two types of linear interpolation values consisting of a linear interpolation value of pixel values of the group and a linear interpolation value of pixel values in a group in which the 2 pixels of the group are interchanged;

generating a value obtained by an addition or subtraction calculation between an output of the generation of the linear interpolation value and an output of the generation of the two types of linear interpolation values; and multiplying the value generated in the addition or subtraction calculation by a parameter relating to a boundary condition in the interpolation section.

10. A non-transitory computer readable storage medium storing a program executable by a computer execute a method comprising the steps of:

generating an interpolated pixel value at an interpolation position through linear interpolation, based on pixel values of a pair of pixels among a plurality of pixels;

generating a plurality of correction values by respectively performing linear interpolation based on a pair of difference values among a plurality of difference values between pixel values of the plurality of pixels;

multiplying the plurality of correction values by a parameter relating to a boundary condition at the interpolation position; and generating a pixel value at the interpolation position based on the interpolated pixel value and the plurality of correction values multiplied by the parameter.

\* \* \* \* \*